Patented Oct. 2, 1934

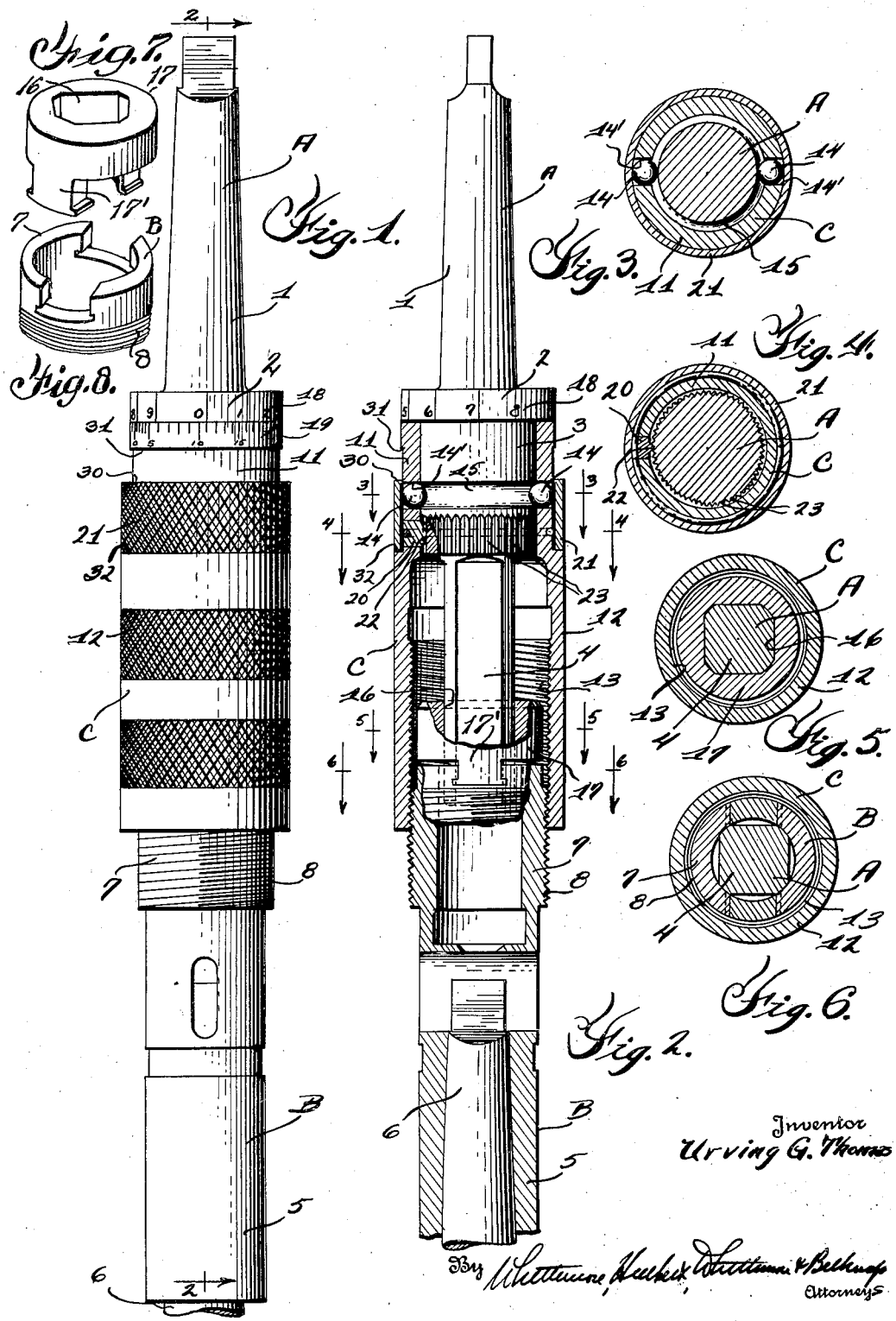

1,975,215

UNITED STATES PATENT OFFICE 1,975,215

TOOL HOLDER

Urving G. Thomas, Detroit, Mich., assignor to Eclipse Counterbore Company, Detroit, Mich., a corporation of Michigan Application April 24, 1933, Serial No. 667,755

9 Claims. (Cl. 279—9)

This invention relates generally to tool holders and refers more particularly to holders for boring or cutting tools such as counterbores, drills, reamers, taps, etc.

One of the essential objects of the invention is to provide a holder of this type wherein the tool receiving socket thereof is adjustable longitudinally relative to the driving shank of the holder so that the distance between a tool in said socket and a chuck or other suitable means in which the driving shank of the holder is inserted may be varied at will.

Another object is to provide a holder wherein the adjustment just referred to can be easily and quickly made by the movement of a sleeve relative to both the socket and driving shank of the holder.

Another object is to provide a holder wherein the sleeve just mentioned envelops portions of and serves as a union or coupling between said socket and driving shank.

Another object is to provide a holder wherein provision is made upon both the sleeve and driving shank for accurately determining the adjustment of the socket relative to the driving shank.

Another object is to provide a holder wherein means is provided for positively locking the parts once the desired adjustment is made, without the additional necessity of any other tools such as wrenches, screw drivers, etc.

Other objects, advantages and novel details of construction of this invention will be made more apparent as this description proceeds, especially when considered in connection with the accompanying drawing, wherein:

Figure 1 is a side elevation of a tool holder embodying my invention;

Figure 2 is a vertical sectional view taken on the line 2—2 of Figure 1;

Figure 3 is a sectional view taken on the line 3—3 of Figure 2;

Figure 4 is a sectional view taken on the line 4—4 of Figure 2;

Figure 5 is a sectional view taken on the line 5—5 of Figure 2;

Figure 6 is a sectional view taken on the line 6—6 of Figure 2.

Figures 7 and 8 are perspective views of certain elements shown in Figure 2.

Referring now to the drawing, A is the driving shank; B is the tool receiving socket; and C is the sleeve of a tool holder embodying my invention. As shown, the shank A has the conventional tapered portion 1 for insertion into a suitable chuck or other driving means (not shown), an annular flange 2 at the inner end of the tapered portion, a cylindrical portion 3 upon the inner side of the flange 2, and a stem portion 4 at the inner end of the cylindrical portion 3.

The tool receiving socket B has a tubular portion 5 for the reception of the shank 6 of the cutting tool and is provided at one end of this portion with an enlarged tubular portion 7 having external threads 8.

The sleeve C has a tubular portion 11 that is rotatable upon the cylindrical portion 3 of the shank and has an enlarged tubular portion 12 that is rotatable about and has internal threads 13 for engagement with the external threads 8 on the socket B. Any suitable means such as the balls 14 may be used to hold the sleeve against movement longitudinally of the shank while permitting rotation of the sleeve about the shank. As shown, the balls 14 are within openings 14' at diametrically opposite sides of the tubular portion 11 of the sleeve and engage an annular groove 15 in the cylindrical portion 3 of the shank. Thus the sleeve C forms a union or coupling between the shank A and tool receiving socket B.

In the present instance, the stem 4 of the shank is substantially square-shaped in cross section throughout its length and is received within a correspondingly shaped opening 16 in a collar 17 at the inner end of and constituting a driver for the socket B. Preferably, this collar 17 is formed separately from and is detachably secured to the socket B, however, such collar may be an integral part of socket B or the said socket may be provided at its inner end with a square socket or opening for the reception of the stem 4. As shown the collar 17 is provided at diametrically opposite points of its lower end with depending lugs 17' which slidably engage inverted substantially T-shaped slots in the socket B. In any case, the socket B will be prevented from turning relative to the shank A upon rotation of the sleeve C, hence such socket and its driver 17 will be forced by the engagement of the threads 13 with the threads 8 to move longitudinally of the stem 4.

The adjustment of the socket B relative to the shank A may be accurately determined by the cooperating graduations 18 and 19, respectively, on the flange 2 and adjacent end of the sleeve C, and the parts may be positively locked in any adjusted position by a spring actuated detent 20 and a sleeve 21. As shown, this detent 20 is movable transversely of a wall of the sleeve and has a single tooth 22 that is adapted upon rotation of the sleeve C to successively engage longitudinally extending serrations 23 of the cylindrical portion 3 of the shank. The sleeve 21 is movable longitudinally of the sleeve C to alternately cover and uncover the spring actuated detent 20, and the arrangement is preferably such that the detent 20 is held in engagement with one of the serrations 23 and the sleeve C is held against rotation relative to the shank A when the detent 20 is covered by the sleeve 21 but that the detent 20 may ride over the serrations 23 so that the sleeve C may be rotated in either direction about the shank A when the detent is uncovered. In this connection it will also be noted that the sleeve 21 holds the balls 14 against displacement from the openings 14' in the sleeve C. In the process of construction the sleeve 21 is slipped over the upper end of the tubular portion 11 of the sleeve C until the upper end 30 of the sleeve passes beyond a shoulder 31 of the tubular portion. The end 30 of the sleeve 21 is then reduced so as to be smaller than the periphery of the shoulder 31. As a result the sleeve 21 is confined on the tubular portion 11 of the sleeve C between the shoulder 31 and a shoulder 32 of the sleeve C, the construction and arrangement of parts being such that the balls 14 are always covered by the sleeve 21 and the detent 20 may be alternately covered and uncovered by said sleeve.

In use, the parts are normally in the position illustrated in Figure 2. Should it be desired to adjust the socket B carrying the tool, the sleeve 21 is first slipped upwardly on the sleeve C to uncover the detent 20. The sleeve C may then be rotated about the shank A, the exact adjustment being determined accurately by the graduations 18 and 19. If the sleeve C is rotated clockwise, the socket B will be moved toward the cylindrical portion 3 of the shank whereas the socket B will be moved away from the cylindrical portion of the shank upon rotation of the sleeve C anti-clockwise on the shank. Thus such rotation will either elongate or contract the holder. After the desired adjustment is made the sleeve 21 is then moved downwardly on the sleeve C over the detent 20 so that the parts will be locked in such adjusted position.

What I claim as my invention is:

1. In a tool holder, a driving shank, a sleeve upon and rotatable about said shank, means associated with the sleeve and shank for holding the sleeve upon the shank, means associated with the sleeve and shank for holding the sleeve against rotation relative to the shank, and means movable relative to the sleeve to alternately cover and uncover one of said means and operable in all positions thereof to cover the other of said means.

2. In a tool holder, a driving shank, a sleeve upon and rotatable about said shank, means associated with the sleeve and shank for holding the sleeve upon the shank, means associated with the sleeve and shank for holding the sleeve against rotation relative to the shank, and a sleeve mounted to move longitudinally of the sleeve aforesaid to alternately cover and uncover one of said means and operable in all positions thereof to cover the other of said means.

3. In a tool holder, a shank having a cylindrical portion and a stem at one end of said portion, said cylindrical portion having a peripheral groove and a serrated portion, a sleeve rotatable on the cylindrical portion of the shank, and means for holding the sleeve against movement longitudinally of the shank including a ball carried by the sleeve and disposed within the groove, a detent within the sleeve engaging the serrated portion of the shank, and a sleeve normally spanning the detent and ball.

4. In a tool holder, a shank having a cylindrical portion and a stem at one end of said portion, said cylindrical portion having a peripheral groove and a serrated portion, a sleeve rotatable on the cylindrical portion of the shank, and means for holding the sleeve against movement longitudinally of the shank, including a ball carried by the sleeve and disposed within the groove, a detent movable transversely of the sleeve and having a tooth engaging the serrated portion of the shank, and a sleeve normally spanning the detent and ball, said last mentioned sleeve being movable longitudinally of the sleeve aforesaid to alternately cover and uncover the detent.

5. In a tool holder, a shank having a cylindrical portion and a stem at one end of said portion, said cylindrical portion having a peripheral groove and a serrated portion, a sleeve rotatable on the cylindrical portion of the shank, said sleeve being provided at spaced points longitudinally thereof with shoulders and provided between said shoulders with transversely extending openings, and means for holding the sleeve against movement longitudinally of the shank including a ball within one of said openings and engaging the groove, a detent within the other of said openings and engaging the serrated portion of the shank, and a sleeve on the sleeve aforesaid between said spaced shoulders normally spanning the detent and ball.

6. A tool holder having a driving shank, a tool receiving socket, a member rotatable about said shank and socket, means for holding said member against longitudinal movement on the shank, means operable upon rotation of the member to cause the socket to move longitudinally relative to the shank, and accessible manually operable means for positively locking the member to the shank once the desired movement is made, including means for holding the first mentioned means in operative position.

7. A tool holder having a driving shank, a tool receiving socket, a member rotatable about said shank and socket, means operable upon rotation of the member to cause the socket to move longitudinally relative to the shank, said shank and member having cooperating graduations thereon for accurately determining the movement of the socket relative to the shank, and means for holding the member against rotation relative to the shank so that the socket will be held against movement relative to the shank once the desired movement is made, including a detent movable in the member relative to the shank, and a sleeve movable on the member to cover and uncover the detent.

8. In a tool holder, a driving shank, a sleeve mounted to turn but prevented from moving longitudinally of said shank, said sleeve and shank having cooperating graduations for determining the turning movement of the sleeve relative to the shank, and accessible manually operable means for locking the sleeve to the shank once the desired movement is made, including a longitudinally movable detent carried by the sleeve and engageable with the shank, a sleeve on the sleeve aforesaid movable to cover and uncover the detent, and yieldable means associated with the shank and detent operable when the detent is uncovered to hold the detent in yielding engagement with the shank and against displacement, and operable when the detent is covered to permit such detent to be held by the last mentioned sleeve in non-yielding engagement with the shank.

9. In a tool holder, a driving shank, a sleeve mounted for both rotary and longitudinal movements on said shank, a second sleeve adjustable on the first mentioned sleeve, means constantly rendered inaccessible by the second sleeve for holding the first sleeve against longitudinal movement on the shank, and means alternately rendered accessible and inaccessible by the second sleeve for holding the first sleeve against rotation relative to the shank.

URVING G. THOMAS.